United States Patent Office 3,408,429
Patented Oct. 29, 1968

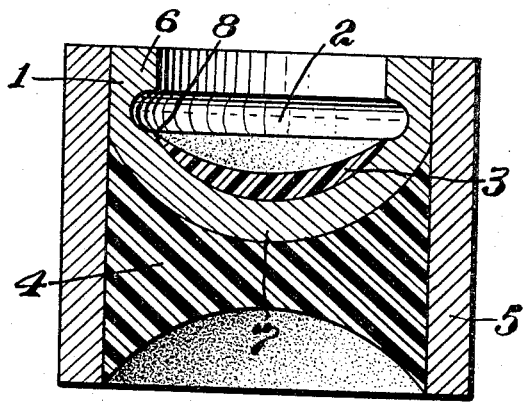
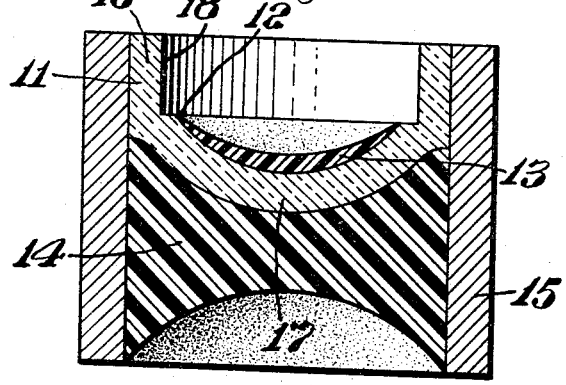
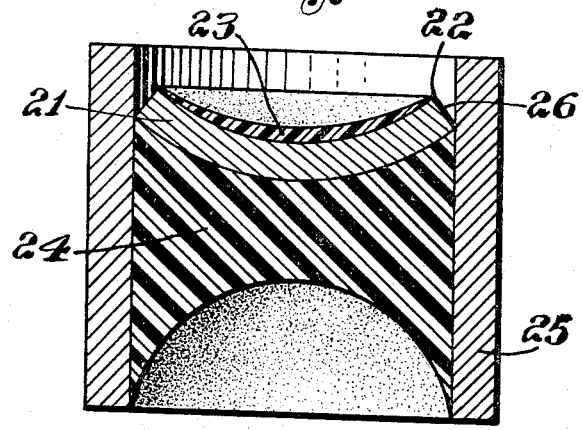

3,408,429
METHOD FOR CENTRIFUGAL CASTING
A CONTACT LENS
Otto Wichterle, Prague, Czechoslovakia, assignor to Ceskoslovenska akademie ved, Prague, Czechoslovakia
Continuation-in-part of application Ser. No. 393,505, Sept. 1, 1964. This application Jan. 4, 1965, Ser. No. 423,034
Claims priority, application Czechoslovakia, Sept. 11, 1963, PV 5,041/63
3 Claims. (Cl. 264—1)

ABSTRACT OF THE DISCLOSURE

A precisely defined feather edge can be formed on a contact lens made by polymerization of a monomer mixture mainly consisting of ethyleneglycol monomethacrylate and a small amount of ethylenglycol dimethacrylate as a cross linking agent in a mold rotating approximately about the central axis and having a concavely arcuate mold face portion if the latter is bounded by another mold face portion with which it forms a sharply angular annular edge, and if the mold is rotated fast enough to drive the initially fluid monomer mixture to that edge, but not beyond the same.

---

This application is a continuation-in-part of my copending application Ser. No. 393,505, filed on Sept. 1, 1964, and now abandoned.

This invention relates to the manufacture of contact lenses and lens blanks which, in the finished condition, are soft, but shape-retaining hydrogels of sparingly crosslinked organic polymers of the type described in U.S. Patent No. 2,976,576, and particularly to molds in which the lens material is confined during polymerization.

It is known to produce such lenses or lens blanks from liquid mixtures of suitable monomers which are polymerized with the aid of catalysts or initiators while being contained in a rotating open mold. The mold has a bottom surface which is spherical or otherwise concavely arcuate in at least two axial sections perpendicular to each other. One surface of the polymer produced thus is convex and conforms to the mold surface whereas the opposite surface is concave and has an approximately paraboloidal shape which is determined by centrifugal forces and the surface tension of the polymerization mixture.

The size of the mold and the amount of polymerization mixture are readily coordinated in such a manner that the convex and concave surfaces of the lens or lens blank meet at a small acute angle to constitute an annular lens rim which is soft because of its thinness and is mainly instrumental in assuring adhesion of the lens to the eye of the wearer. The refractive strength of the lens is determined mainly by the shape and size of the mold bottom, by the rotary speed of the mold during polymerization, by the inclination of the axis of rotation relative to the mold axis, the density of the polymerizing liquid, by its wetting angle, and the like.

The polymeric lens blank obtained by this method under carefully controlled conditions does not require further mechanical finishing. The conditions necessary for obtaining perfect lenses or lens blanks are difficult to maintain, however, and it has been found that the number of rejects produced under industrial conditions is relatively high. The defects causing rejection are mainly located at the lens rim and are due to non-uniform wetting of the concave mold surface by the thin layer of liquid polymerization mixture which ultimately becomes the lens rim.

The changes in the wetting angle between the liquid in the rim portion and the mold surface during polymerization have been found to lag behind the expected values based on the average degree of polymerization of the mixture. The rim portion of the polymerization mixture is thus in a state of non-equilibrium which is much affected by local variations in the rate of material interchange with neighboring portions of the mixture and by the localized presence of trace impurities on the mold surface. If agitation of the polymerization mixture during charging of the mold causes a portion of the liquid to be carried beyond the boundary line between the concave surfaces of the mold and the mixture corresponding to the prevailing rotary speed of the mold, the liquid portion flowing over the boundary cannot again be united with the main polymer body in a homogeneous structure, and usually forms a very thin flash or other minor irregular projection on the lens rim. If such a projection is folded over the concave lens surface, and thereby comes into contact with the cornea of the wearer, it can cause cornea irritation.

If a very thin, and therefore weak, irregularly projecting part of the lens is broken off in handling of the lens, the break may extend into the normal lens rim because of stress concentration and the relatively low mechanical strength of the gel structure, and cause more serious defects. Even where the irregular shape of the rim does not affect proper functioning of the lens, it makes the lens unsightly and invites rejection by a prospective user who is aware of the long-range effects of the most minute imperfections in contact lenses on the eye.

If for any reason a portion of the polymerization mixture is caused to recede from the normal boundary of the concave surfaces of the mold and liquid, the increase in the viscosity of the liquid because of polymerization is rapid enough to prevent return of the liquid to the normal boundary in a uniform front. An irregular edge portion again is found in the finished lens.

The frequency of defective lens rims can be reduced by reducing the rate of polymerization under otherwise similar conditions, thereby permitting all portions of the liquid mixture in the mold to assume the desired position before increasing viscosity interferes with proper flow. The rate of polymerization, however, determines the dwell time of each lens blank in the mold, and a decrease in the rate of polymerization reduces the output of the available equipment in an undesirable manner.

The object of the invention is the avoidance of defective rim portions in contact lenses of the type described without sacrificing the full capacity of the available equipment.

It has been found that the principal cause of such defects can be eliminated by providing the rotating mold with an annular surface which is angularly offset from the concave bottom surface in a direction radially outward from the axis of rotation and contiguously adjacent the bottom surface so that the two mold surfaces define a sharp edge about the axis of rotation which is located at the desired boundary of the liquid polymerization mixture. It has been found that the liquid is not readily driven over such an edge by centrifugal forces if the mold material is not readily wetted by the polymerization mixture.

Other features and many of the attendant advantages of this invention will become apparent from the following description of preferred embodiments of the invention when considered in conjunction with the attached drawing in which:

FIG. 1 shows a first mold of the invention together with supporting structure in elevational section on the axis of mold rotation;

FIG. 2 shows a modified mold arrangement in a view corresponding to that of FIG. 1; and FIG. 3 shows yet another mold arrangement of the invention in a similar view.

Referring initially to FIG. 1, there is seen a mold assembly consisting essentially of a mold insert 1 of circular cross section and of a tubular carrier 5 in which the mold insert is coaxially secured by means of a cement layer 4. The carrier 5 is an element of the apparatus, not otherwise shown, for rotating the mold 1 about its axis, and further comprising a chuck receiving the carrier and a motor for rotating the chunk at a controlled speed in a manner conventional in itself.

The mold insert is approximately cup-shaped and has a cylindrical side wall 6 and a spherical bottom wall 7. The side wall conformingly engages the interior wall of the carrier 5. The spherically concave face of the bottom wall 7 is centered in the common axis of the side wall and of the carrier which is also the axis of rotation of the mold. The diameter of the mold insert is approximately 5 to 12 millimeters.

An inwardly open annular groove 2 is formed in the mold insert 1 where the side and bottom walls would otherwise meet. An inner annular surface of the groove 2 contiguously adjacent the bottom face extends in a radial plane and thus forms an edge of angular cross section with the bottom wall 7. When the mold insert 1 is charged with a measured amount of liquid polymerization mixture 3 and rotated at the correct speed for forming a lens blank from the mixture, the mixture assumes the shape shown in FIG. 1 in which it tapers to a thin rim at the edge 8 between the groove 2 and the concave bottom face of the mold insert 1, and congeals in this shape during polymerization.

The mold shape illustrated in FIG. 1 has been found suitable for mold inserts made of metals inert to the polymerizing material, and which are readily machined from a solid cylindrical blank.

The modified mold assembly shown in FIG. 2 consists of a glass mold insert 11 which is held in a tubular carrier 15 by a cement plug 14. The cylindrical inner surface of the side wall 16 and the spherically concave inner surface of the bottom wall 17 of the mold insert 11 are separated by an annular internal mold face 18 which extends in a radial plane. The mold face 18 meets the side wall face at a right angle and the bottom wall face at an obtuse angle to form with the latter a sharply angular edge 12.

The mold insert shown in FIG. 2 is most conveniently produced by shaping a hot piece of glass between dies. The carrier 15 may itself form a part of the die assembly for shaping the mold insert. Good mold inserts have also been made of hot glass by vacuum molding techniques.

When the carrier 15 is held in the chuck of a motor and rotated about its axis, a small amount of catalyzed polymerization mixture 13 inserted into the mold cavity assumes the desired shape with a uniform, regularly contoured thin edge at the angular edge 12 between the mold face 18 and the bottom wall surface.

The mold assembly illustrated in FIG. 3 includes a mold insert 21 of inert metal, such as stainless steel or titanium, which is a segment of a hollow sphere having concave and convex faces connected by an annular frusto-conical face 26 which is perpendicular to the concave and convex faces. The right-angle edge 22 between the face 26 and the concave surface of the mold insert limits radially outward flow of the polymerization mixture 23 to the desired illustrated shape during rotation of the mold insert which is mounted coaxially in a tubular cylindrical carrier 25 by means of a cement plug 24.

While mold assemblies consisting of a tubular carrier, a mold insert, and means for fastening the insert to the carrier are preferred because they can be produced inexpensively with high precision, the mold may consist of a unitary structure having a carrier integal with the element which actually defines the mold cavity. Certain molded plastics are unaffected by the preferred polymerization mixtures, and unitary mold structures are preferably made of such plastics. The invention, however, is not limited to any specific mold material inert to the polymerization mixture.

This invention also is not specifically concerned with the material that is being shaped in the mold into a contact lens or a contact lens blank that may require swelling in physiological saline solution to make it ready for use. Many hydrophilic monomers may be copolymerized in the molds of the invention with cross linking agents with or without the use of catalysts or initiators to form hydrogels which are transparent and soft when swelled with water.

Esters of polyhydric alcohols with unsaturated acids are suitable constituents of the polymerization mixture. The acid component of such esters may be itaconic, maleic, fumaric acid, but acrylic acid and methacrylic acid are preferred. The alcohol component of the ester may be ethylene glycol, a polyglycol ether, glycerol, pentaerythritol, or mannitol. Most of the acid component is initially present in an ester having at least one free alcoholic hydroxyl group, whereas a minor portion of the acid is present in the form of esters in which at least two acid moieties are linked to a single alcohol radical. Monoesters and diesters of dihydric alcohols are thus typical main constituents of the polymerization mixture.

A polymerization mixture which yields contact lenses of high quality may thus be prepared, for example, from ethylene glycol monomethacrylate containing minor amounts of diethylene-glycol methacrylate, and ethylene glycol bis-methacrylate. The original presence of a substantial amount of free methacrylic acid in the mixture is not harmful, but the finished lens blank must be soaked in aqueous sodium bicarbonate solution or the like to neutralize any free acid present before the lens may be used. The mixture of acrylic esters polymerizes readily at ambient temperature in the presence of known initiators.

It is readily possible, however, to maintain the molds of the invention at temperatures as high as 70° to 90° C. which permit the polymerization of mixtures in which polyvinyl alcohol is the main constituent, and glyoxal is a cross-linking agent.

Yet another useful type of polymerization mixture may be based on esters of hydroxy acids with polymerizable unsaturated alcohols. Malic, lactic, tartaric, and citric acid are representative of suitable acid moieties in such esters. The most readily available suitable alcohol component is allyl alcohol, but others will readily suggest themselves to those skilled in the art.

The polymerization mixture may or may not contain solvents and diluents such as water and liquid substances that are readily replaced by water when the sparingly cross-linked polymer obtained is immersed in an aqueous medium. Ethylene glycol and glycerol are typical of the liquid media useful as solvents and diluents.

In using the mold of the invention, a suitable amount of liquid polymerization mixture is placed in the mold cavity, and the initial rotary speed of the mold is chosen slightly higher than that necessary for raising the liquid mixture to the mold edge by centrifugal forces. The liquid quickly advances to the angular edge, and the bottom surface of the mold is uniformly wetted without any spilling of the liquid over the edge. The rotary speed of the mold may then be reduced to its normal value before the viscosity increase of the polymerization mixture can interfere with establishment of the desired concave surface of the lens blank.

In most instances, the mold edge is located in a plane perpendicular to the axis of rotation of the mold, and the lens produced is symmetrical relative to that axis. If the central portion of the concave mold surface is of a shape which is generally symmetrical with respect to the axis of rotation, but the plane of the mold edge is obliquely inclined with respect to that axis, there is obtained an asymmetrical lens whose rim has the desired regularity. Such a lens is held on the cornea in a fixed angular position with respect to the optical axis of the eye because of the pressure of the eye lid. Lenses whose refraction has a cylindrical component must be prevented from rotating about the optical axis of the eye and may advantageously be prepared in a mold having an edge obliquely inclined relative to the mold axis.

Other configurations and combinations of mold bottom surfaces and liquid confining edges will readily suggest themselves to those skilled in the art, and it will be appreciated that the invention is not limited to molds whose concave surfaces are symmetrical with respect to the axis of rotation nor to edges which extend in a plane surface.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:
1. A method of making a contact lens which comprises:
 (a) polymerizing a liquid mixture of a polymerizable monomer with a minor amount of a cross linking agent in a mold having an axis and a first mold face concavely arcuate in all axial sections, said axis transversely passing through said mold face, and a second annular mold face extending in a surface transverse of said axis, said mold faces jointly forming a sharply angular annular edge extending about said axis and spaced from the same; and
 (b) rotating said mold about said axis during the polymerizing of said mixture at a speed greater than the speed required to drive the mixture to said edge by centrifugal forces, but smaller than the speed required to drive the mixture over said edge.
2. A method of making a contact lens which comprises:
 (a) placing a mixture of a polymerizable monomer with a minor amount of a cross linking agent in a mold having an axis, a first mold face concavely arcuate in at least two axial planes perpendicular to each other, and a second annular mold face extending in a surface intersecting said first mold face, said mold faces jointly forming a sharply angular annular edge extending about said axis and spaced from the same;
 (b) rotating said mold about said axis at a first speed until said mixture is driven to said edge by centrifugal forces, said first speed being sufficient to drive the mixture into contact with said edge over the entire length thereof, but smaller than the speed required to drive the mixture over said edge;
 (c) thereafter rotating said mold about said axis at a second speed sufficient to hold said mixture in contact with said edge, but smaller than said first speed; and
 (d) polymerizing said mixture during rotation of said mold at said second speed until the same congeals into a shape-retaining body.
3. A method as set forth in claim 2, wherein said mold faces are of a material not readily wetted by said liquid mixture.

References Cited

UNITED STATES PATENTS

| | | | |
|---|---|---|---|
| 2,443,390 | 6/1948 | Kingston | 264—1 |
| 2,671,932 | 3/1954 | Pique | 264—1 |
| 3,010,153 | 11/1961 | Bittner | 264—311 |
| 3,118,198 | 1/1964 | Prunier | 264—1 |
| 3,132,017 | 5/1964 | Coleman et al. | 264—311 |
| 3,155,479 | 11/1964 | Zimmerman | 264—311 |
| 3,274,301 | 9/1966 | Kulp | 264—1 |

FOREIGN PATENTS

| | | |
|---|---|---|
| 990,207 | 4/1965 | Great Britain. |

OTHER REFERENCES

"Epoxy Parabolic Mirrors" Archibald, Modern Plastics, August 1957, pp. 116, 117 TP 986.

JULIUS FROME, *Primary Examiner.*

A. H. KOECKERT, *Assistant Examiner.*